United States Patent Office 3,660,323
Patented May 2, 1972

3,660,323
PRESSURE SENSITIVE ADHESIVE MASS
Roger C. Raguse, Michigan City, Ind., assignor to The
Scholl Mfg. Co., Inc., Chicago, Ill.
No Drawing. Filed Mar. 30, 1970, Ser. No. 24,003
Int. Cl. C08c 9/08
U.S. Cl. 260—5
6 Claims

ABSTRACT OF THE DISCLOSURE

Pressure sensitive adhesive mass particularly useful for adhesive tapes, the mass including a blend of a polyisoprene, a polystyrene-polyisoprene-polystyrene block copolymer, natural rubber, and conventional additives in controlled amounts to provide an adhesive composition which evidences improved adhesion to the backing coupled with satisfactory physical properties in all other respects.

BACKGROUND OF THE INVENTION

Field of the invention

This invention is in the field of pressure sensitive adhesive compositions employing both natural and synthetic rubbers in controlled amounts to provide a mass which exhibits better adhesion to the backing than comparable masses heretofore tested while retaining other desirable physical properties.

DESCRIPTION OF THE PRIOR ART

U.S. Pat. No. 3,239,478 describes a block copolymer adhesive composition of the type which is included in the adhesive of the present invention. However, the pressure sensitive masses described therein, while being useful for various industrial purposes are not particularly suitable for use in the manufacture of surgical types because they do not have the combination of creep resistance, tack, adhesiveness and sufficiently low allergenic reaction toward the skin.

Some attempts have been made to modify the properties of such block copolymers by using them in conjunction with synthetic isoprene polymers. While some improvements have been achieved along these lines, it developed that the modification of the adhesive characteristics of the block copolymer by the isoprene polymer reduced the adhesion of the mass to the backing. This is particularly important when a surgical tape is applied in overlying convolutions, when it is important that the adhesive mass on one surface have an affinity for the outer backing material of the next adjacent convolution.

SUMMARY OF THE INVENTION

The present invention provides an adhesive mass particularly suitable for the manufacture of surgical tapes, the adhesiveness stemming primarily from a combination of a polyisoprene polymer, a polystyrene-polyisoprene-polystyrene block copolymer and a controlled, critical amount of natural rubber. Specifically, it has been found that the addition of from 20 to 25% by weight of natural rubber, such as pale crepe rubber to a blend of polyisoprene rubber and a polystyrene-polyisoprene-polystyrene block copolymer very substantially improves the adhesion of the mass to the backing without detracting from its tack, holding power, low creep and absence of allergenic reactions.

Other objects, features and advantages of the invention will be readily apparent from the following description of certain preferred embodiments thereof, although variations and modifications may be effected without departing from the spirit and scope of the novel concepts of the disclosure.

DESCRIPTION OF THE PREFERRED EMBODIMENTS

In the formulation of the adhesive mass of the present invention, the first step consists in forming a blended mixture of the adhesive components and modifiers, after which this batch is blended with one or more tackifiers in typical rubber blending machines.

The initial batch contains a mixture of a cis-1; 4 polyisoprene having a Mooney viscosity (ML4' at 212° F.) of between 75 and 95 with a polystyrene-polyisoprene-polystyrene block copolymer having a center block of polyisoprene having a molecular weight of from 15,000 to 250,000 and a terminal block of polystyrene at each end of the center block, each terminal block having a molecular weight of from 5,000 to 125,000. The mixture of these two synthetic rubber adhesives should contain at least 30% by weight of the polystyrene-polyisoprene-polystyrene block copolymer. Amounts in excess of 50% by weight do not provide any improvement in properties, and make the composition more expensive. To this mixture of polyisoprene polymers there is added a natural rubber composition which is preferably pale crepe rubber although other types of natural rubber can be used if color can be tolerated in the adhesive. It has been found that the addition of pale crepe rubber in an amount of 20 to 25% by weight of total polymers (polyisoprene plus block copolymer plus rubber) provides a balance of properties in the adhesive mass making it extremely suitable for use in surgical tapes.

The initial batch also contains zinc oxide in an amount of from 35 to 45% by weight of the entire batch, a plasticizer in an amount of from 1 to 3% by weight of the batch and an antioxidant in an amount up to 1% by weight of the entire batch. Lanolin is particularly prefered as a plasticizer but other materials such as hydrogenated polybutene of a molecular weight of about 3,000 to 20,000 or white mineral oil, or similar plasticizers can also be employed.

The composition also contains an antioxidant of which there are many on the market. A particularly preferred one is known as "Agerite Gel" which is a mixture of alkylated diphenylamines in combination with a petroleum wax.

The original batch is then blended with suitable tackifiers in an amount such that the tackifier constitutes from 25 to 35% by weight of the entire mixture. For the purposes of the present invention, any of the tackifiers which are normally used in adhesive tape formulations can be employed such as a dehydrogenated rosin, a hydrogenated rosin, mixtures of the two, or esters of the same such as the glycerol ester of hydrogenated rosin. In addition, suitable tackifiers such as the polyterpenes can also be employed.

The following specific examples illustrate the improvements which are achieved with the improved compositions of the present invention.

Example 1

In this and in succeeding examples, the initial batch which was to be combined with the tackifiers totaled 240 parts by weight. The polymeric constituent totaled 115 parts by weight, and the remainder consisted of 95 parts by weight of zinc oxide, 24 parts by weight starch, 5 parts by weight of lanolin, and 1 part by weight of antioxidant.

In this example, the 115 parts by weight of the polymeric materials contained 56% by weight of cis-1; 4 polyisoprene ("Natsyn 400" 24% by weight of the polystyrene-polyisoprene-polystyrene block copolymer ("Kraton 1107") and 20% by weight of pale crepe rubber. This batch when combined in the ratio of 240 parts by weight to 110 parts by weight of two rosin type tackifiers (55 parts by weight of "Staybelite ester No. 10" and 55 parts by weight of "Nirez 3098 LM resin"), after milling produced an adhesive mass which evidenced definitely a higher adhesion toward the backing than the same type of composition but without the pale crepe rubber.

Example 2

In this test, all of the ingredients were the same as in Example 1, with the exception that the content of the pale crepe rubber was increased to 25% by weight of the three polymeric materials. After milling with the tackifiers, this adhesive mass evidenced excellent adhesion to backing.

Increasing the amount of natural rubber to a value in excess of 25% by weight of the polymers serves no useful purpose, as it tends to destroy the balance between the improved adhesion to backing and the adhesion to skin.

The adhesive masses of the present invention can be laid on any suitable backing material such as cotton fabric or rayon acetate and provide the improved adhesion to backing which is characteristic of the materials of the present invention.

I claim as my invention:

1. An adhesive compoistion having improved adhesion to a backing consisting essentially of a blended mixture of:
    (1) a batch containing a mixture of:
        (a) a synthetic cis-1; 4 polyisoprene having a Mooney viscosity of from 75 to 95,
        (b) a polystyrene-polyisoprene-polystyrene block copolymer having a center block of polyisoprene having a molecular weight of from 15,000 to 250,000 and a terminal block of polystyrene at each end of the center block, each terminal block having a molecular weight of from 5,000 to 125,000, said mixture of (a) and (b) including from 30 to 50% by weight (b),
        (c) a natural rubber in an amount of from 20 to 25% by weight of (a) plus (b) plus (c),
        (d) zinc oxide in an amount of from 35 to 45% by weight of the batch,
        (e) a plasticizer in an amount of from 1 to 3% by weight of the batch,
        (f) an antioxidant in an amount up to 1% by weight of the batch, and
    (2) a tackifier in an amount of from 25 to 35% by weight of the entire mixture.

2. The composition of claim 1 in which said natural rubber is pale crepe rubber.

3. The composition of claim 1 in which said plasticizer is lanolin.

4. The composition of claim 1 in which said tackifier is a hydrogenated rosin ester.

5. An adhesive tape comprising a backing of cotton cloth, and an adhesive layer thereon having the composition of claim 1.

6. An adhesive tape comprising a backing of rayon acetate cloth and an adhesive layer thereon having the composition of claim 1.

References Cited
UNITED STATES PATENTS

| | | | |
|---|---|---|---|
| 3,502,497 | 3/1970 | Crocker | 117—122 P |
| 3,239,478 | 3/1966 | Harlan | 260—876 B |
| 3,451,537 | 6/1969 | Freeman et al. | 117—122 PA |
| 3,534,965 | 10/1970 | Harrison et al. | 260—5 |

JOHN C. BLEUTGE, Primary Examiner

U.S. Cl. X.R.

117—122 P, 122 PA; 128—156; 260—8, 27 BB, 33.6 A, 45.9 R, 876 B